Patented Feb. 10, 1953

2,628,231

UNITED STATES PATENT OFFICE 2,628,231

AZO COMPOUNDS OF THE ANTHRAQUINONE SERIES

Frederic B. Stilmar, Wilmington, Del., assignor to E. I. du Pont de Nemours & Company, Wilmington, Del., a corporation of Delaware No Drawing. Application March 15, 1949, Serial No. 81,616

5 Claims. (Cl. 260—207.1)

This invention relates to the preparation of a new class of compounds of the anthraquinone series, and more particularly new acylated 1-amino- and 1-nitroanthraquinone-2-carbonyl hydrazines.

The anthraquinone vat dyes are known to be of particular value because of their excellent fastness properties, and, while a large range of colors has been produced commercially, there has not been produced a red dye in this class which will dye in the bright shades desirable and have the good fastness properties of dyes of this class in general. Several red dyes have been produced in the anthraquinone series, but they lack the strength or brightness or certain fastness properties which are particularly desirable and which usually identify the dyes of this class.

It is an object of the present invention to produce a class of new compounds which, although exhibiting dye properties in themselves, are particularly useful as intermediates in the preparation of bright red dyes of the anthraquinone vat dye class which exhibit excellent fastness properties and high tinctorial strength. A more specific object of the invention is to produce acylated 1-amino- and 1-nitroanthraquinone-2-carbonyl hydrazines from organic dicarboxylic acid chlorides of the formula:

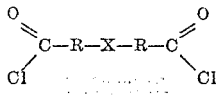

in which R stands for a hydrocarbon radical of the group consisting of benzene and diphenyl radicals and X for a connecting bridge of the group consisting of —N=N—, —CH=CH—, —CH₂—, —O—, —S—, —SO₂— and —CO—.

The compounds of this invention are prepared by reacting 1-aminoanthraquinone-2-carbonylhydrazine or 1-nitroanthraquinone-2-carbonylhydrazine with an acid chloride of an aromatic dicarboxylic acid containing at least two phenyl groups connected through —C—, —O—, —S— or —N—, such as azo-benzene-dicarbonyl chlorides, azo-diphenyl-dicarbonyl chlorides, stilbene-dicarbonyl chlorides, diphenylmethane-dicarbonyl chlorides, diphenylsulfide-dicarbonyl chlorides, diphenyl-ether-dicarbonyl chlorides, diphenylsulfone-dicarbonyl chlorides and benzophenone-dicarbonyl chlorides, which types of dicarbonyl chlorides are illustrated in the following examples. The reaction of the hydrazine and the dicarbonyl chloride is preferably carried out at elevated temperatures in an inert solvent such as nitrobenzene or trichlorobenzene. Excellent yields of the acylated hydrazines are obtained which have the general formula:

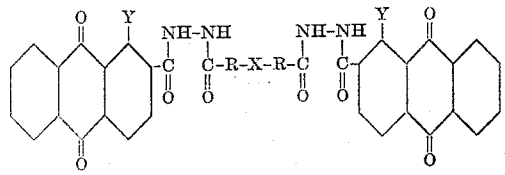

in which Y stands for a substituent of the group consisting of —NH₂ and —NO₂ and R and X have the same significance as given above.

The acylated anthraquinone hydrazines of this invention are particularly valuable in the manufacture of bis-anthraquinone-oxdiazoles which are bright red to scarlet vat dyes. This latter class of dyes is produced by subjecting the bis-acylated hydrazides to the action of acid condensing agents such as thionyl chloride, phosphorus oxychloride, p-toluene sulfonic acid, etc., whereby ring closure of the hydrazide groups to oxdiazole rings is effected. These dyes are more particularly disclosed and claimed in co-pending application Serial No. 81,617 filed March 15, 1949.

The following examples are given to illustrate the invention. The parts used are by weight, unless otherwise specified.

Example 1

8.5 parts of azobenzene-4,4'-dicarbonyl chloride, 20 parts of 1-nitroanthraquinone-2-carbonyl hydrazine and 200 parts of nitrobenzene are mixed under agitation and slowly heated to 170°–175° C. This temperature is maintained for one hour. The product, in the form of light yellow needles, is filtered off, washed with benzene and dried.

This product has a melting point of 289°–291° C. and dyes cotton in weak red shades from a yellowish-red alkaline hydrosulfite vat (with reduction of the nitro groups to the amine). The dyeing changes to a dull violet color with alkali. It dissolves in sulfuric acid, giving a yellow color, and has the formula:

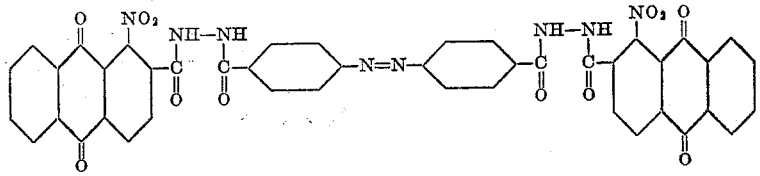

Example 2

A mixture of 92.2 parts of azobiphenyl-4,4'-dicarbonyl chloride, 13.7 parts of 1-nitroanthraquinone-2-carbonyl hydrazine and 200 parts of nitrobenzene is slowly heated to 175°–180° C. and agitated for three hours at that temperature. The product, which precipitates as yellow plates, is filtered off, washed with benzene and dried. This product vats with reduction of the nitro groups to the amines, and dyes cotton orange shades that turn bluer when treated with alkali. It has the formula:

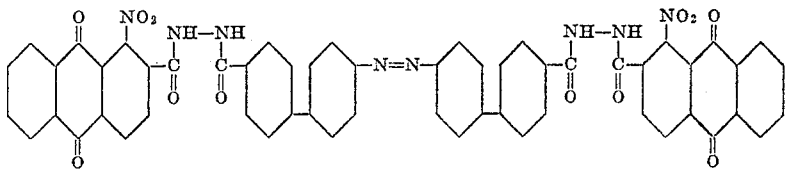

Example 3

A mixture of 4.6 parts of azobiphenyl-4,4'-dicarbonyl chloride, 6.7 parts of 1-aminoanthraquinone-2-carbonyl hydrazine and 150 parts of nitrobenzene is slowly heated to 170° C. and agitated for 10 hours at this temperature. The resulting product, consisting of very fine orange particles, is filtered off and washed with benzene and dried. It dyes cotton in scarlet-orange shades from a red alkaline hydrosulfite vat. When treated with free alkali, the dyeings become wine-violet. The color in sulfuric acid is reddish-yellow. It has the formula:

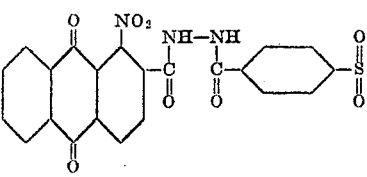

Example 4

A mixture of 5 parts of diphenylether-4,4'-dicarboxylic acid, 150 parts of nitrobenzene, 10 parts of thionyl chloride and 1/100 part of pyridine is heated at 100°–110° C. under reflux until solution occurs (with the formation of the diacid chloride).

The excess thionyl chloride is removed by blowing with a stream of air and there is then added 13.2 parts of 1-nitroanthraquinone-2-carbonyl hydrazine.

After heating the mass under agitation at 160°–165° C. for 8 hours, the resulting product is filtered off, washed with benzene and dried. The product has the formula:

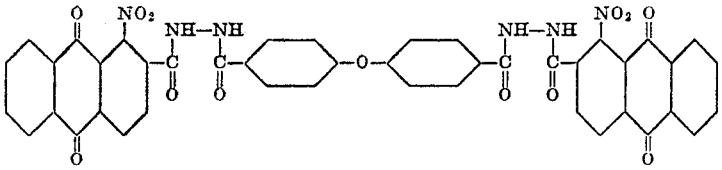

Example 5

A mixture of 1.7 parts of diphenylsulfone-4,4'-dicarbonyl chloride, 100 parts of ortho-dichlorobenzene and 3.4 parts of 1-nitroanthraquinone-2-carbonyl hydrazine is heated slowly to 160°–170° C. and held for two hours with stirring. The product precipitates as small colorless crystals and is filtered off, washed with benzene and dried.

It dyes cotton from a red-colored alkaline hydrosulfite vat. The dyeing is a weak red turning violet when treated with alkali. Its sulfuric acid solution is almost colorless. The formula of this product is considered to be:

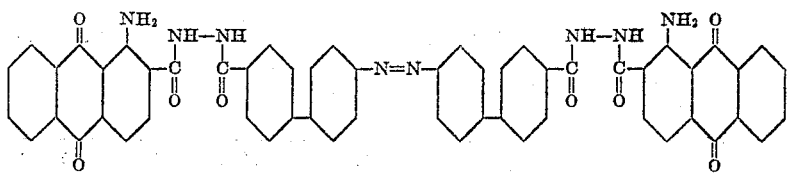

Example 6

1 part of benzophenone-4,4'-dicarbonyl chloride, 2 parts of 1-nitroanthraquinone-2-carbonyl hydrazine, and 35 parts of ortho-dichlorobenzene are mixed under agitation and the mixture is heated at 160°–170° C. for two hours. The colorless intermediate is isolated as in the above examples. It has the formula:

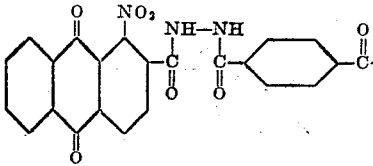

Example 7

6.1 parts of azobenzene-3,3'-dicarbonyl chloride, 13.6 parts of 1-nitroanthraquinone-2-carbonyl hydrazine, and 260 parts of ortho-dichlorobenzene are mixed and, while agitated, the mixture is heated to 160°–170° C. and maintained for two hours. The pale yellowish bis-hydrazide separates as very small microcrystalline particles, which is filtered off, washed with benzene and dried. It has the formula:

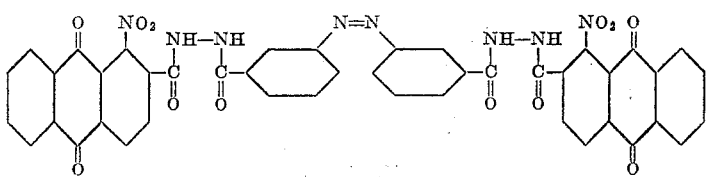

Diphenylmethane-3,3'-dicarbonyl chloride, diphenylsulfide-4,4'-dicarbonyl chloride or stilbene-4,4'-dicarbonyl chloride may be substituted for the particular dicarbonyl chlorides employed in the above examples to give new acylated anthraquinone-2-carbonyl hydrazines of similar reactivity and chemical properties. These compounds, as well as those specifically described in the examples, are all readily converted to the bis-anthraquinone-oxdiazoles which are valuable bright red-to-scarlet vat dyes.

The compounds of this invention may be ring closed without isolation from the nitrobenzene or other solvent mass by adding the acid condensing agent such as thionyl chloride and continuing the heating at temperatures of from 160°–170° C. to produce the oxdiazoles as more particularly disclosed in my co-pending application Serial No. 81,617 filed March 15, 1949.

As illustrated in the above examples, the dicarboxylic acid chloride may be formed as a preliminary step in the preparation of the condensation product without isolation from the organic solvent in which it is formed, although where preferred it may be first prepared in any desired manner and after isolation condensed with the anthraquinone-2-carbonyl hydrazine. It will be obvious that other acid halides can be employed in place of the acid chloride.

By vatting the nitro compounds produced from the 1-nitro-anthraquinone-2-carbonyl hydrazine with sodium hydrosulfite and caustic, they may be converted to the corresponding amino compounds. Usually, however, it will be found desirable to effect ring closure of the nitro compounds prior to their reduction to the amines.

I claim:

1. The acylated anthraquinone-carbonyl hydrazines which have the general formula:

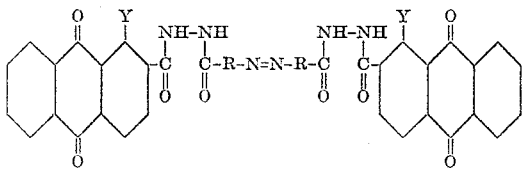

wherein R stands for a hydrocarbon radical of the group consisting of benzene and diphenyl radicals, and Y stands for a substituent of the group consisting of $-NH_2$ and $-NO_2$.

2. The acylated 1-nitroanthraquinone-2-carbonyl hydrazine having the formula:

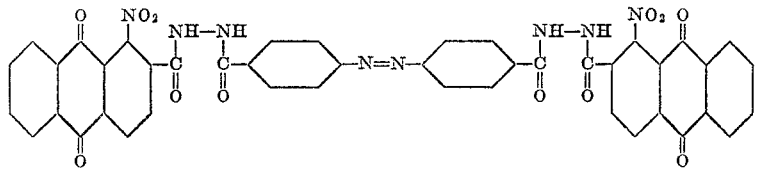

3. The acylated 1-aminoanthraquinone-2-carbonyl hydrazine having the formula:

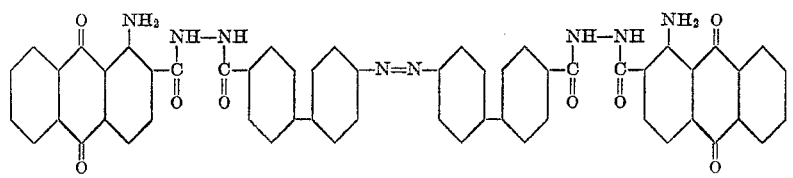

4. The acylated 1-nitroanthraquinone-2-carbonyl hydrazine having the formula:

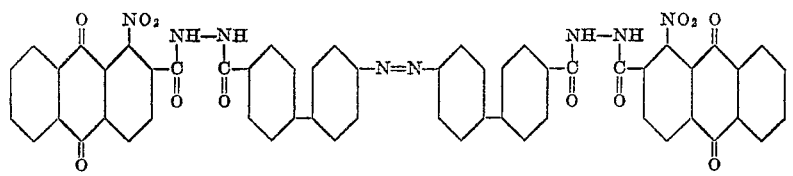

5. The acylated 1-nitroanthraquinone-2-carbonyl hydrazine having the formula:
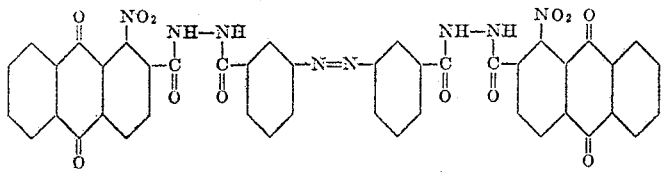
FREDERIC B. STILMAR.
REFERENCES CITED
The following references are of record in the file of this patent:
UNITED STATES PATENTS
| Number | Name | Date |
|---|---|---|
| 2,175,803 | Honold et al. | Oct. 10, 1939 |
| 2,228,455 | Honold et al. | Jan. 14, 1941 |
| 2,395,229 | Lowe et al. | Feb. 19, 1946 |
| 2,567,132 | Stilmar | Sept. 4, 1951 |